(12) United States Patent
Bellise et al.

(10) Patent No.: US 11,318,554 B2
(45) Date of Patent: May 3, 2022

(54) PIN SPOTTING SYSTEM WITH MODULAR WELDING SOURCE

(71) Applicant: DURO DYNE CORPORATION, Bay Shore, NY (US)

(72) Inventors: Andrew J. Bellise, Farmingdale, NY (US); David B. Krupnick, Mattituck, NY (US); William Vasquez, Jr., East Islip, NY (US)

(73) Assignee: Duro Dyne Corporation, Bay Shore, NY (US)

( * ) Notice: Subject to any disclaimer, the term of this patent is extended or adjusted under 35 U.S.C. 154(b) by 379 days.

(21) Appl. No.: 16/479,266

(22) PCT Filed: Jan. 26, 2018

(86) PCT No.: PCT/US2018/015348
§ 371 (c)(1),
(2) Date: Jul. 19, 2019

(87) PCT Pub. No.: WO2018/140664
PCT Pub. Date: Aug. 2, 2018

(65) Prior Publication Data
US 2019/0381598 A1    Dec. 19, 2019

Related U.S. Application Data

(60) Provisional application No. 62/451,443, filed on Jan. 27, 2017.

(51) Int. Cl.
*B23K 11/00* (2006.01)
*B23K 9/20* (2006.01)
*F16L 59/02* (2006.01)

(52) U.S. Cl.
CPC ............ *B23K 11/0053* (2013.01); *B23K 9/20* (2013.01); *F16L 59/028* (2013.01)

(58) Field of Classification Search
CPC ...... B23K 11/0053; B23K 9/20; B23K 11/36; B23K 28/00; B23K 11/00; F16L 59/028
(Continued)

(56) References Cited

U.S. PATENT DOCUMENTS 3,162,750 A    12/1964   Anderson
4,438,314 A     3/1984   Giannone
(Continued)

FOREIGN PATENT DOCUMENTS

WO    WO 2008/059173 A2    5/2008

OTHER PUBLICATIONS

International Search Report dated Apr. 19, 2018 issued in PCT/US2018/015348.
(Continued)

*Primary Examiner* — Dana Ross
*Assistant Examiner* — James F Sims, III
(74) *Attorney, Agent, or Firm* — Carter, DeLuca & Farrell LLP; George Likourezos; Bradley J. Shelowitz (57) ABSTRACT

The modular pin spotting system described herein allows a common welding source to be utilized with both hand held pinspotters and fixed pinspotters. This allows the operator to choose the mode of operation for the welding source based on operator needs. In some aspects, the pin spotting system includes a mobile welding source, a ground handpiece, a handheld pinspotter apparatus, and a fixed pinspotter apparatus. The welding source is removably attachable to either of the hand held pinspotter apparatus and fixed pinspotter apparatus and configured to supply welding energy to the attached pinspotter apparatus. Each of the hand held and fixed pinspotter apparatus are configured to energize the mobile welding source to supply welding energy to a weld pin positioned against a sheet metal surface to affix the weld pin to the sheet metal surface through welding.

10 Claims, 7 Drawing Sheets

(58) Field of Classification Search
USPC .......................................................... 219/93
See application file for complete search history.

(56) References Cited

U.S. PATENT DOCUMENTS

| 5,277,353 | A | 1/1994 | Budig et al. |
| 6,388,224 | B1 | 5/2002 | Torvinen |
| 2007/0056934 | A1 | 3/2007 | Hsu |
| 2008/0053967 | A1 | 3/2008 | Moore |

OTHER PUBLICATIONS

"Automatic Bulk Feed 4FT. Conversion Platform Owner's Manual", Duro Dyne Corporation (Mar. 31, 2017), retrieved from the Internet at https://www.durodyne.com/machinery/FPP4-Manual.pdf.

PIN SPOTTING SYSTEM WITH MODULAR WELDING SOURCE

CROSS-REFERENCE TO RELATED APPLICATIONS

This application claims the benefit of U.S. Provisional Application No. 62/451,443 filed on Jan. 27, 2017, the entire contents of which are incorporated herein by reference.

FIELD

The present disclosure relates to systems, apparatus, and methods for pin spotting insulation to sheet metal for use in a heating, ventilation, and air conditioning (HVAC) system.

BACKGROUND

Pin spotting insulation fastening machines are widely used in the HVAC industry to fasten insulation to the sheet metal used for HVAC ductwork. Pin spotting machines come in a variety of forms including portable hand held pinspotters such as the Duro Dyne® MF-12A Hand Held Pinspotter and fixed pinspotters such as the Duro Dyne® FG Mach III Pinspotter, both manufactured and sold by Duro Dyne Corporation of New York. A portable hand held pinspotter such as the MF-12A typically includes a welding source and a pinspotting handpiece. The hand held pinspotter provides an operator with the capability to perform pinspotting on the spot in hard to reach places, e.g., at a work site where ductwork is being installed, to perform repairs/add additional insulation to existing ductwork, and to attach insulation to non-standard ductwork components where the ductwork component may not be amenable to use with a fixed pinspotter. On the other hand, fixed pinspotters, such as the FG Mach III, provide an operator with a stable platform that allows for efficient pinspotting by utilizing automatic pin feeding mechanisms, integrated welding source circuitry, pneumatic actuation, and foot actuated operation that allows the operator to utilize both hands when performing pinspotting. Fixed pinspotters allow for faster and more accurate pinspotting and remove the need for an operator to hold a handpiece to perform pinspotting.

BRIEF SUMMARY

The modular pin spotting system described herein allows a common welding source to be utilized with both hand held pinspotters and fixed pinspotters. This allows the operator to choose the mode of operation for the welding source based on operator needs. For example, when the operator needs to perform volume pin spotting, e.g., on standard ductwork sections, the welding source may be removably attached to a fixed pinspotting apparatus, weld supply lines may be attached in electrical communication to the welding source, and control circuitry of the fixed pinspotting apparatus may be configured to control the welding source in conjunction with a pneumatic actuation of a pinspotting head to drive a weld pin through insulation to engage against the ductwork for welding by the welding source. In another example, when the operator needs to perform mobile pin spotting, the operator may detach the welding source from the fixed pinspotting apparatus and may connect a hand piece to the welding source. The operator may carry the welding source and the handpiece to the location where pinspotting is required and may perform pinspotting on the spot.

By providing a pin spotting system where the same welding source may be utilized by an operator in both mobile and fixed applications, efficiencies may be achieved. For example, the fixed pinspotting apparatus may have reduced complexity, size, and weight due to the lack of integrated welding source circuitry. Likewise, a customer may purchase a single welding source for use with both mobile and fixed applications, thereby providing the customer with greater capabilities at a lower cost.

A modular pin spotting system is disclosed including a mobile welding source, a ground handpiece configured for removable attachment to the mobile welding source, and a handheld pinspotter apparatus configured for removable attachment to the mobile welding source. The handheld pinspotter apparatus configured to energize the mobile welding source to supply welding energy through the hand held pinspotter apparatus and ground handpiece to a weld pin positioned against a sheet metal surface to affix the weld pin to the sheet metal surface through welding. The system further including a fixed pinspotter apparatus. The fixed pinspotter apparatus includes a mounting frame configured to removably receive the mobile welding source and first and second welding cables configured for removable attachment to the mobile welding source. The fixed pinspotter apparatus is configured to energize the mobile welding source to supply welding energy through the first and second welding cables to a weld pin positioned against a sheet metal surface by the fixed pinspotter apparatus to affix the weld pin to the sheet metal surface through welding.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

Figure 1:
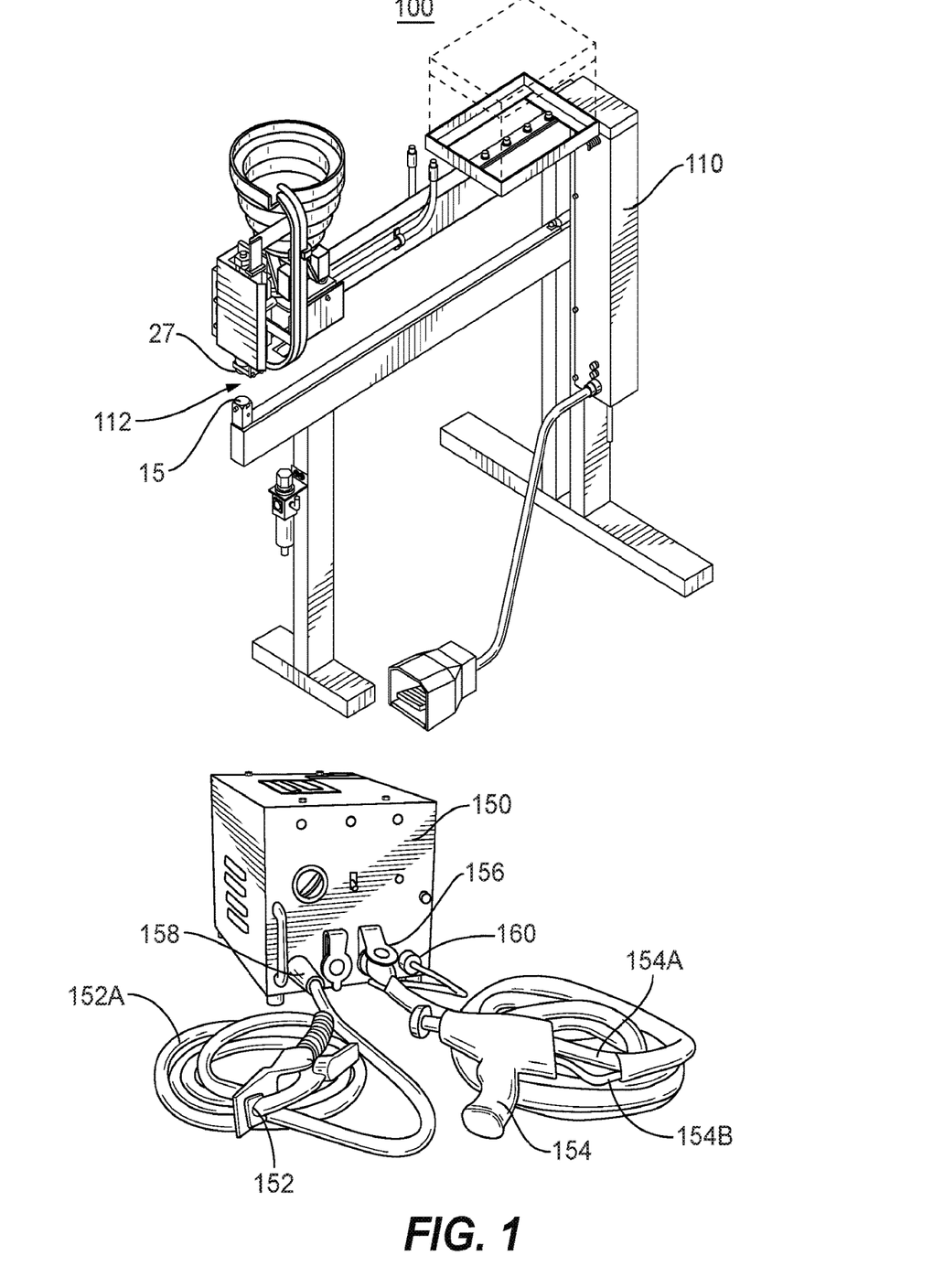
FIG. 1 is an isometric view of a modular pin spotting system including a welding source, a fixed pinspotter apparatus, and a hand held pinspotter apparatus in accordance with an aspect of the present disclosure.
Figure 2:
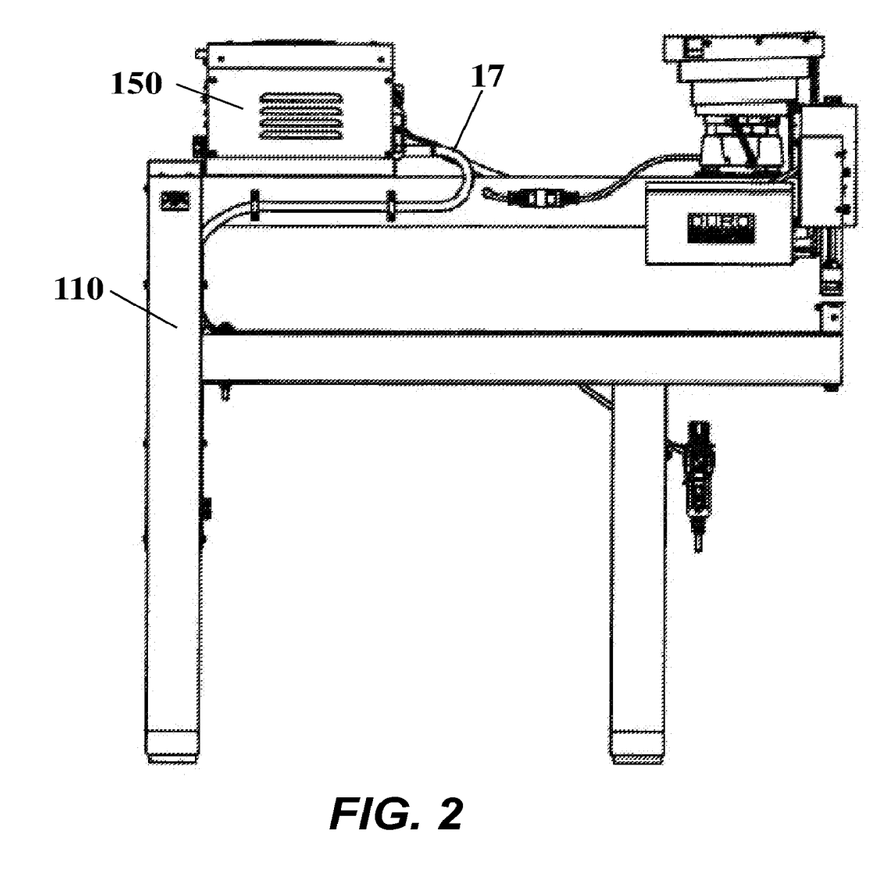
FIG. 2 a left side view of the fixed pinspotter apparatus of FIG. 1.
Figure 3:
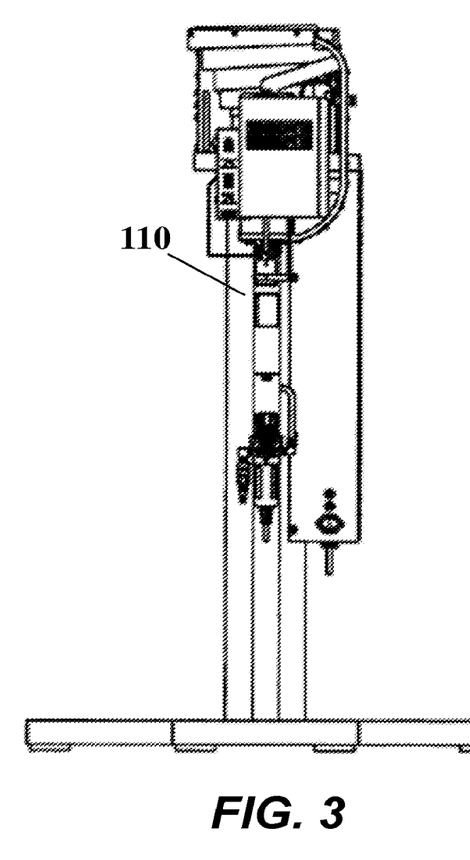
FIG. 3 a front view of the fixed pinspotter apparatus of FIG. 1.
Figures 4, 5:
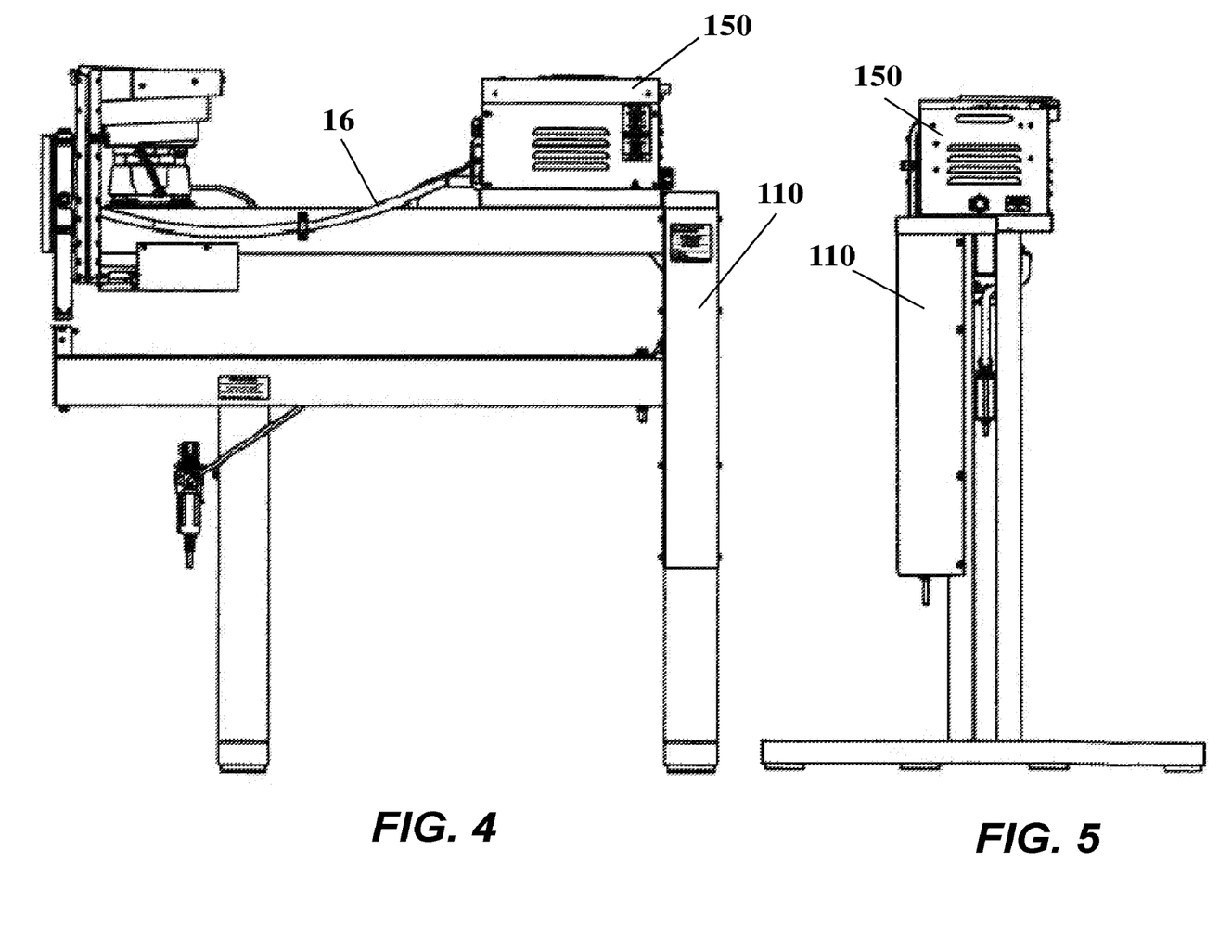
FIG. 4 a right side view of the fixed pinspotter apparatus of FIG. 1.
FIG. 5 a rear view of the fixed pinspotter apparatus of FIG. 1.

With reference now to FIG. 1, a modular pinspotting system 100 is illustrated including a fixed pinspotter apparatus 110, a modular welding source 150, a ground hand piece 152, and a hand held pinspotter 154.

With reference now to FIGS. 1-6, when an operator wishes to use fixed pinspotter apparatus 110, modular welding source 150 may be removably attached or mounted to fixed pinspotter apparatus 110 at a mounting frame 43. Front weld cable assembly 16 and rear weld cable assembly 17 may be connected to weld connections 156 and 158, respectively to provide electrical communication from welding source 150 to fixed pinspotter apparatus 110, e.g., at upper tip assembly 27 and lower tip assembly 15. During operation of fixed pinspotter apparatus 110, electrical energy from welding source 150 may travel through front weld cable assembly 16 and rear weld cable assembly 17 to a weld pin positioned through insulation against the sheet metal of ductwork by fixed pinspotter apparatus 110 to affix the weld pint to the sheet metal through welding.

Figure 6:
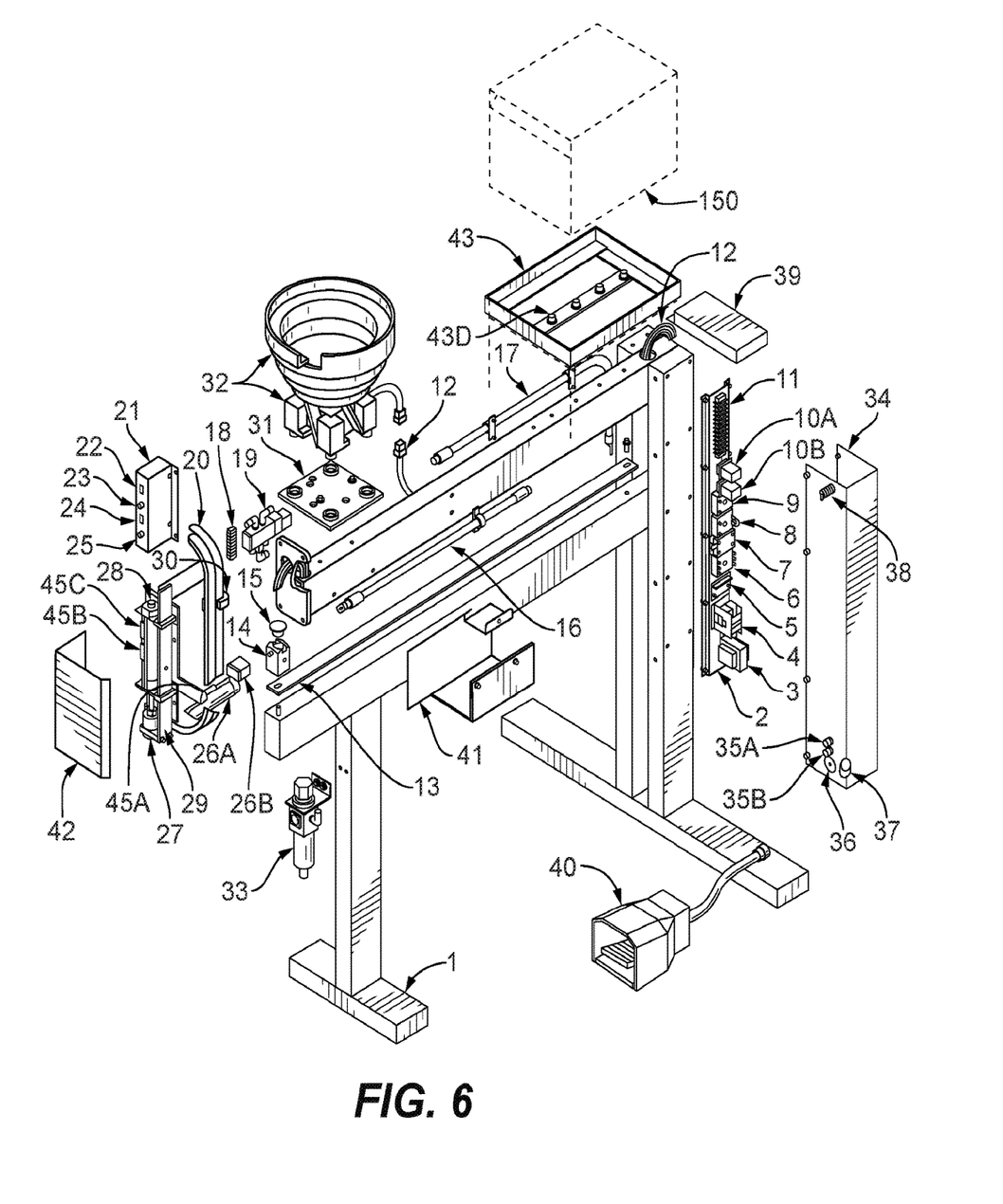
FIG. 6 is an exploded view of the fixed pinspotter apparatus of FIG. 1.
Figure 7:
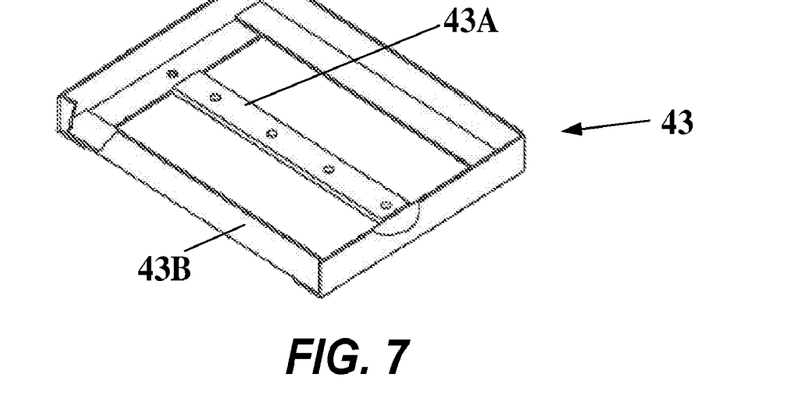
FIG. 7 is an isometric view of a mounting frame of the fixed pinspotter apparatus of FIG. 1 for mounting the welding source of FIG. 1 in accordance with an aspect of the present disclosure.
Figure 8:
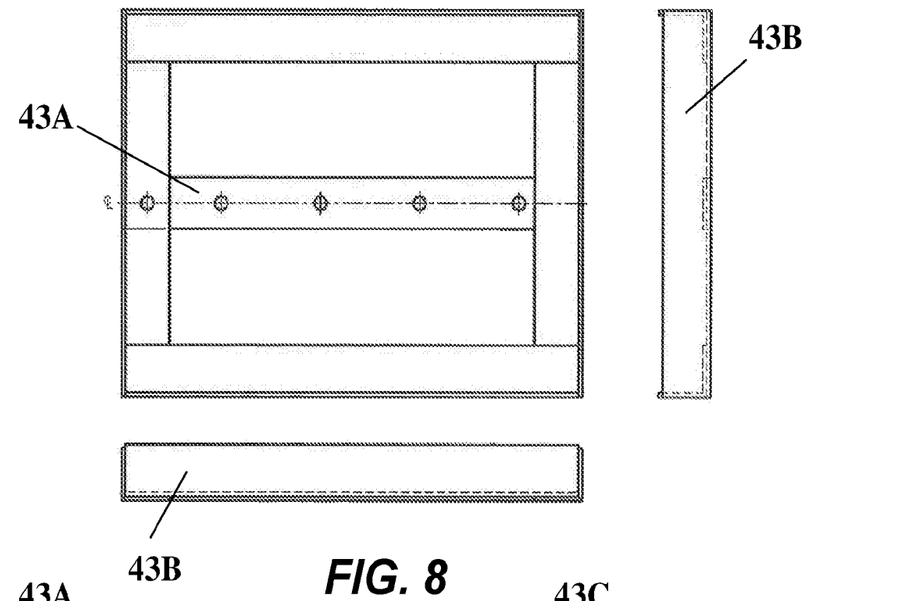
FIG. 8 is an orthographic projection of the top, left side and front views of the mounting frame of FIG. 7.
Figure 9:
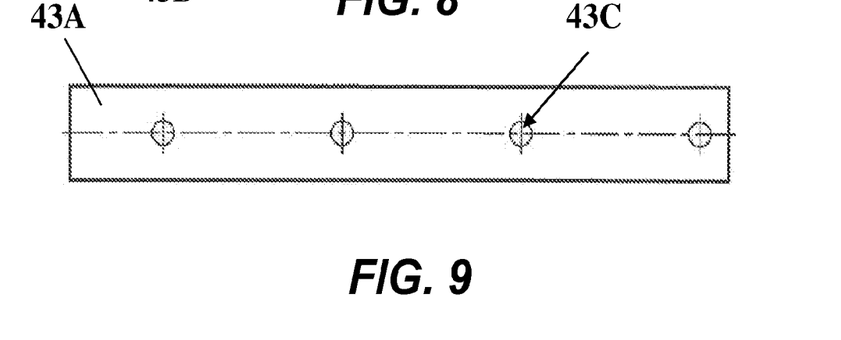

In some aspects, fixed pinspotter apparatus 110 may include any or all of the following components as illustrated in FIG. 6:

1) Frame Weldment
2) Component Chassis Assembly
3) 24 Volt Multi-Tap Transformer
4) Contactor
5) Receiving Board Assembly
6) 120 Volt Full Wave Control Rectifier
7) Solid State Relay
8) Feed Timer w/Push-on 82K Resistor (Timer #2)
9) Dwell Timer (Timer #1)
10) Relay w/LED
A)—First Pulse Relay
B)—Short Cycle Relay
11) 12 Position Terminal Block
12) Wiring Harness
13) Lower Arm Copper
14) FG Mandrel
15) Lower Tip Assembly
16) Front Weld Cable Assembly
17) Rear Weld Cable Assembly
18) 8 Post Terminal
19) Dwell Solenoid Assembly
20) Head Assembly
21) Front Control Box Assembly
22) Rocker Switch—On/Off Main Power
23) #17 Potentiometer Assembly
24) Rocker Switch—Vibrator Speed Control
25) Speed Control Potentiometer Assembly
26) Feed Cylinder Assembly
A)—Feed Cylinder
B)—Feed Solenoid Assembly
27) Upper Tip Assembly
28) Dwell Cylinder Assembly
29) Ram Conductor
30) Track Sensor Assembly
31) Vibrator Base Plate
32) Bowl and Feeder Assembly
33) Air Regulator Assembly
34) Rear Component Enclosure
35) 3 AMP Fuse (A & B)
36) Foot Switch Receptacle
37) 110 Volt Line-Cord with Strain Relief
38) Initiate Weld Cycle Cord
39) Rear Cable Cover
40) Footswitch
41) Feed Cylinder Guard
42) Dwell Cylinder Guard
43) Welding source mounting Frame
45) Reed Switches
A) Feed Reed Switch
B) First Pulse Reed Switch
C) Dwell Reed Switch
150) Welding source Welding source 150 may be removably mounted to fixed pinspotter apparatus 110 on mounting frame 43. With reference now to FIGS. 7-9, mounting frame 43 includes a mounting bracket 43A and raised sides 43B. Mounting bracket 43A includes openings 43C that are configured to secure welding source 150 to mounting frame 43. For example, in some aspects, mounting pins 43D may be secured to openings 43C as shown, for example, in FIG. 6, and may be configured to slot into openings (not shown) on a bottom surface of welding source 150 to inhibit lateral movement of welding source 150 relative to mounting bracket 43A. In some aspects, welding source 150 may alternatively include protrusions (not shown) on a bottom surface that are configured to slot into openings 43C to inhibit movement of welding source 150 laterally relative to mounting bracket 43A. When welding source is positioned on mounting frame 43, raised sides 43B also server to inhibit lateral movement of welding source 150 relative to mounting frame 43. For example, raised sides 43B may be adjacent to or abutting the sides of welding source 150 such that lateral movement by welding source 150 may result in an engagement of the side of welding source 150 with raised sides 43B, thereby further inhibiting lateral movement in the welding source 150 relative to mounting frame 43.

Once removably mounted to mounting frame 43, welding source 150 may be electrically connected to fixed pinspotter apparatus 110 by attaching front weld cable assembly 16 to ports 156 and 160 of welding source 150 and attaching rear weld cable assembly 17 to port 158 of welding source 150. For example, front weld cable assembly 16 may include communications lines for providing communication between fixed pinspotter apparatus 110 and welding source 150 to allow fixed pinspotter apparatus 110 to control the energization of welding source 105.

Figure 10:
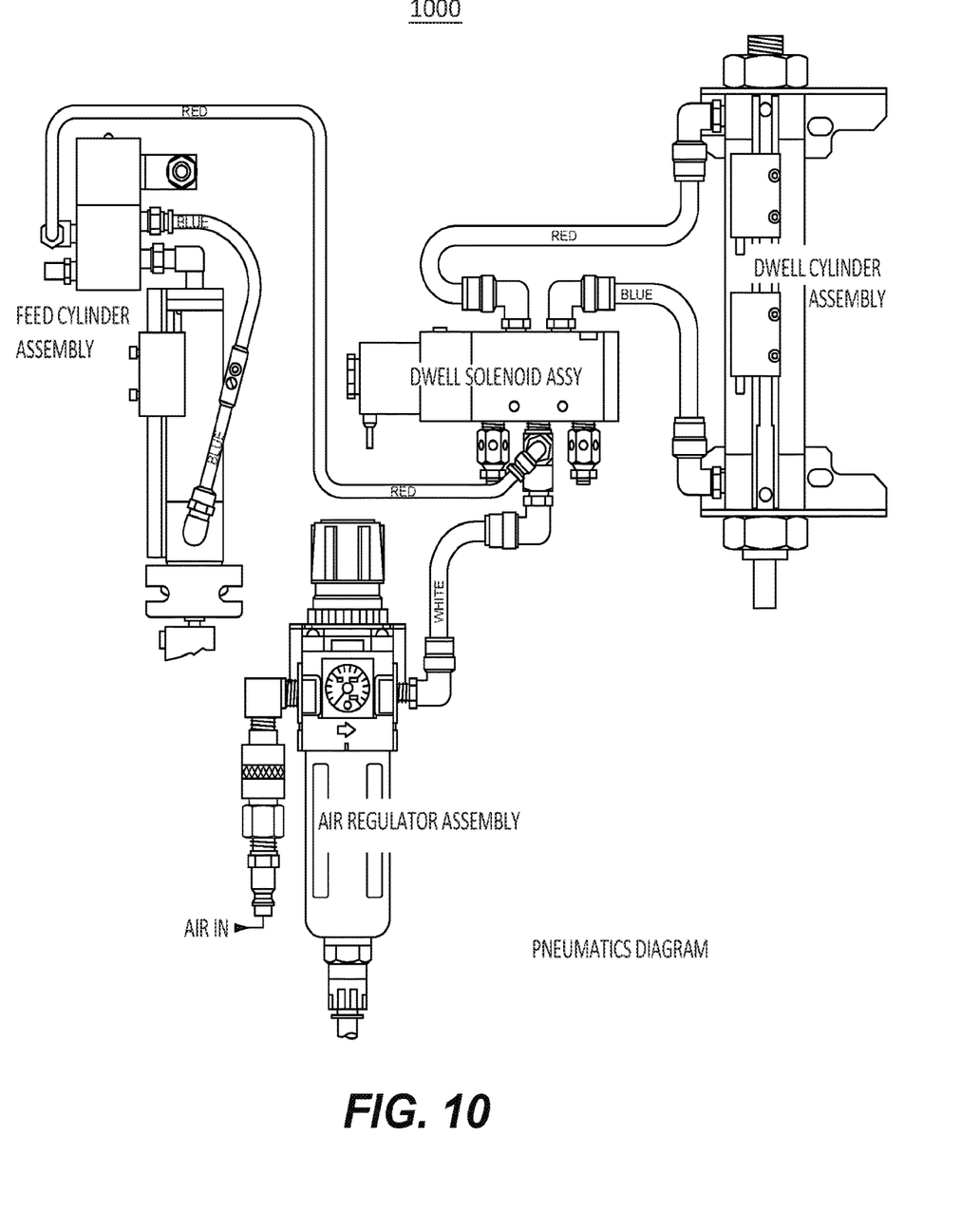
FIG. 10 is a pneumatics diagram of the fixed pinspotter apparatus of FIG. 1.

Referring now to FIG. 10, a pneumatics diagram 1000 for fixed pinspotter apparatus 110 is illustrated. Pneumatics diagram 1000 shows the fluid connections between Air Regulator Assembly 33, feed cylinder assembly 26, dwell solenoid assembly 19, and dwell cylinder assembly 28.

Figure 11:
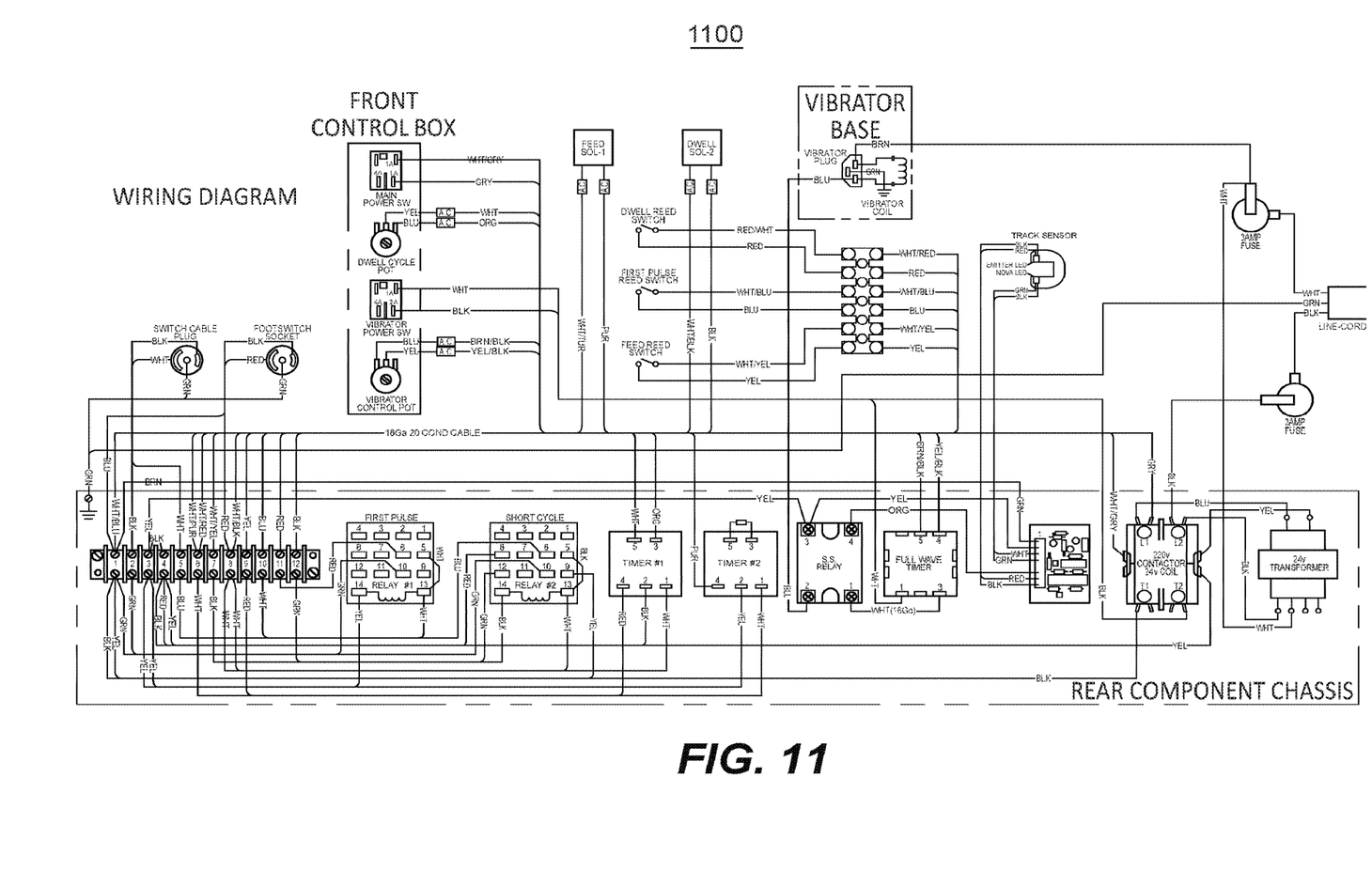
FIG. 11 is an electrical wiring diagram of the fixed pinspotter apparatus of FIG. 1.

Referring now to FIG. 11, a wiring diagram 1100 for fixed pinspotter apparatus 110 is illustrated. Wiring diagram 1100 shows the internal electrical connections within fixed pinspotter apparatus 110 required to control actuation of the pneumatic systems of pneumatics diagram 1000 to position weld pins against sheet metal, load new weld pins, to control the energization of welding source 150 to affix the weld pins to the sheet metal by welding, and other similar functions.

In some aspects, power disbursement within fixed pinspotter apparatus 110 may occur according to the following description.

The 110V Line-Cord 37 may provide 110V energy to the fixed pinspotter apparatus 110 and the pair of 3 AMP Fuses 35. A first of fuses 35 sends power to the contactor 4 and a second of fuses 35 sends power to the vibrator section of the wiring harness 12 and the 24V transformer 3. One leg of the 24V transformer 3 is electrically connected to one side of the contactor 4. The other side of the contactor 4 supplies 24V to the main power rocker switch 22. When main power rocker switch 22 is turned "on", one leg of the contactor 4 supplies 110V power to the vibrator power switch 24, another leg of the contactor 4 supplies 24V power to terminal-1 on the 12 position terminal block 11, and another leg of the contactor 4 supplies 24V power to terminal-4 on the 12 position terminal block 11.

When the vibrator rocker switch 24 is turned "on", one leg supplies 110V to the 120V full wave rectifier 6. One leg of the 120V full wave rectifier 6 supplies 110V to the solid state relay 7, and the solid state relay 7 supplies the 110V power back to the vibrator plug in the wiring harness 12. In some aspects, solid state relay 7 may be energized when the track sensor 30 does not sense the presence of a weld pin in the head assembly track (part of head assembly 20). In this state, receiving board assembly 5 receives a signal from track sensor 30 indicating that track sensor 30 does not sense the presence of weld pins in the track and sends power to the solid state relay 7 to activate the vibrator (part of bowl and feeder assembly 32). The vibrator feeds the weld pins in the Bowl (also part bowl and feeder assembly 32) to the head assembly 20. When the head assembly 20 track fills up, receiving board assembly 5 receives a signal from track sensor 30 indicating that track sensor 30 senses weld pins in the track and turns "off" power to solid state relay 7 to stop the vibrator from feeding weld pins into the head assembly.

During an example operation of fixed pinspotter apparatus 110, foot pedal switch 40 may be depressed by the operator to send an electrical pulse to a dwell timer 9 and through the feed reed switch item 45A to the short cycle relay 10B. The dwell timer 9 activates for a determined preset time. The short cycle relay 10B is latched "on" by the pulse, activating the dwell solenoid 19 which sends a volume of fluid, e.g., air, to the dwell cylinder 28 to actuate dwell cylinder 28 in a downward motion for the duration of the dwell timer 9, a pre-determined amount of time. At the same time as the above, the short cycle relay 10B sends a signal to an activator (not shown) of welding source 150 via front weld cable assembly 16 and port 160 which powers the welding transformer (not shown) of welding source 150 for a pre-determined length of time based on a preset weld timer to supply welding energy through front weld cable assembly 16 and rear weld cable assembly 17. During the downward motion of dwell cylinder 28, the first pulse reed switch 45B closes and the first pulse relay 10A self-latches and remains on until the main power is turned off. The first pulse relay 10A sends the voltage to the input of dwell reed switch 45C.

When the dwell cylinder 28 returns in an upward motion the dwell reed switch 45C closes. The dwell reed switch 45C signals the feed timer 8 to send voltage to the feed solenoid 26B. The feed timer 8 is energized for a pre-determined length of time, which actuates the feed cylinder 26A out and back in to load the next weld pin from the track. When the feed cylinder 26A returns to its original position, the feed reed switch 45A closes, allowing the dwell and weld cycle to activate again.

The operator may continue depressing foot pedal switch 40 for continued actuation of dwell cylinder 28 and powering of the transformer of welding source 150 to affix weld pins through insulation to sheet metal using welding. For example, the operator may position a piece of sheet metal and insulation within the mouth 112 (FIG. 1) of fixed pinspotter apparatus 110 between lower tip assembly 15 and upper tip assembly 27 such that when dwell cylinder 28 is actuated to drive a weld pin toward lower tip assembly 15, the weld pin will be driven through a target portion of insulation to abut against the sheet metal. The transformer (not shown) of the welding source 150 may then be energized by fixed pinspotter apparatus 110 to affix the weld pin to the sheet metal through welding. The operator may repeat this process as many times as desired to affix additional weld pins through insulation to the sheet metal.

When the operator requires more mobility for pin spotting, the operator may detach front and rear weld cable assemblies 16 and 17 from ports 156, 158, and 160 of welding source 150 and remove welding source from mounting frame 43. The operator may then attach ground handpiece 152 to welding source 150 at port 158 using a cable 152A and attach hand held pinspotter 154 to welding source 150 at ports 156 and 160 using a cables 154A and 154B. The hand held pinspotter 154 may then transmit a signal along cable 154B to welding source 150 to energize the transformer (not shown) of welding source 150 to affix weld pins to a portion of sheet metal ductwork through welding that may not be accessible or amenable to the use of fixed pinspotter apparatus 110. In some aspects, for example, hand held pinspotter 154 may be configured to affix a single weld pin at a time.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A modular pin spotting system comprising:
    a mobile welding source;
    a ground handpiece configured for removable attachment to the mobile welding source;
    a hand held pinspotter apparatus configured for removable attachment to the mobile welding source, the handheld pinspotter apparatus configured to energize the mobile welding source to supply welding energy through the hand held pinspotter apparatus and ground handpiece to a weld pin positioned against a sheet metal surface to affix the weld pin to the sheet metal surface through welding; and
    a fixed pinspotter apparatus comprising:
        a mounting frame configured to removably receive the mobile welding source, the mounting frame including:
            a first pair of raised sides spaced from one another;
            a second pair of raised sides spaced from one another and interconnecting the first pair of raised sides to one another; and
            a mounting bracket extending between the first pair of raised sides and having opposite ends connected to the respective second pair of raised sides, the mounting bracket configured to support the mobile welding source thereon and to detachably couple to the mobile welding source; and
        first and second welding cables configured for removable attachment to the mobile welding source, the fixed pinspotter apparatus configured to energize the mobile welding source to supply welding energy through the first and second welding cables to a weld pin positioned against a sheet metal surface by the fixed pinspotter apparatus to affix the weld pin to the sheet metal surface through welding.

2. The modular pin spotting system of claim 1, wherein the mounting bracket includes an opening that is configured to inhibit removal of the welding source from the mounting frame.

3. The modular pin spotting system of claim 2, wherein the mounting bracket includes a pin positioned within the opening and configured to engage against a portion of the welding source to inhibit lateral movement of the welding source relative to the mounting bracket.

4. The modular pin spotting system of claim 1, wherein the fixed pin spotting apparatus further includes a front weld cable assembly, the front weld cable assembly including a front weld cable and a communication line, the communication line being removably attachable to the mobile welding source and configured to control energization of the mobile welding source to supply the welding energy through the first and second welding cables.

5. A modular pin spotting system comprising:
a mobile welding source; and
a fixed pinspotter apparatus comprising:
   a mounting frame configured to removably receive the mobile welding source, the mounting frame including:
     a bottom;
     a first pair of raised sides spaced from one another and extending upwardly from the bottom; and
     a second pair of raised sides spaced from one another and extending upwardly from the bottom, the bottom and the first and second pairs of raised sides collectively defining a cavity configured for receipt of the mobile welding source, wherein the bottom defines at least one aperture therethrough such that a portion of a bottom of the mobile welding source is exposed to an external environment when the mobile welding source is received in the cavity of the mounting frame; and
   first and second welding cables configured for removable attachment to the mobile welding source, the fixed pinspotter apparatus configured to energize the mobile welding source to supply welding energy through the first and second welding cables to a weld pin positioned against a sheet metal surface by the fixed pinspotter apparatus to affix the weld pin to the sheet metal surface through welding.

6. The modular pin spotting system of claim 5, wherein the mounting frame comprises a mounting bracket extending between the first pair of raised sides and having opposite ends connected to the respective second pair of raised sides, the mounting bracket configured to support the mobile welding source thereon and to detachably couple to the mobile welding source.

7. The modular pin spotting system of claim 6, wherein the mounting bracket includes an opening that is configured to inhibit removal of the welding source from the mounting frame.

8. The modular pin spotting system of claim 7, wherein the mounting bracket includes a pin positioned within the opening and configured to engage against a portion of the welding source to inhibit lateral movement of the welding source relative to the mounting bracket.

9. The modular pin spotting system of claim 5, wherein the fixed pin spotting apparatus further includes a front weld cable assembly, the front weld cable assembly including a front weld cable and a communication line, the communication line being removably attachable to the mobile welding source and configured to control energization of the mobile welding source to supply the welding energy through the first and second welding cables.

10. The modular pin spotting system of claim 6, wherein the mounting bracket splits the at least one aperture in the bottom of the mounting frame into a pair of apertures each extending along a length of the mounting bracket.

* * * * *